US010236998B1

(12) United States Patent
Monajemi

(10) Patent No.: US 10,236,998 B1
(45) Date of Patent: Mar. 19, 2019

(54) INTERFERENCE-CANCELLATION-BASED CCA ADJUSTMENT

(71) Applicant: Cisco Technology, Inc., San Jose, CA (US)

(72) Inventor: Pooya Monajemi, Redwood City, CA (US)

(73) Assignee: Cisco Technology Inc., San Jose, CA (US)

( * ) Notice: Subject to any disclaimer, the term of this patent is extended or adjusted under 35 U.S.C. 154(b) by 46 days.

(21) Appl. No.: 15/409,293

(22) Filed: Jan. 18, 2017

(51) Int. Cl.
| *H04W 4/00* | (2018.01) |
| *H04B 15/00* | (2006.01) |
| *H04W 74/08* | (2009.01) |
| *H04W 56/00* | (2009.01) |
| *H04B 17/336* | (2015.01) |
| *H04L 25/02* | (2006.01) |
| *H04W 84/12* | (2009.01) |
| *H04W 88/08* | (2009.01) |

(52) U.S. Cl.
CPC ........... *H04B 15/00* (2013.01); *H04B 17/336* (2015.01); *H04L 25/0224* (2013.01); *H04W 56/002* (2013.01); *H04W 74/0816* (2013.01); *H04W 84/12* (2013.01); *H04W 88/085* (2013.01)

(58) Field of Classification Search
None
See application file for complete search history.

(56) References Cited

U.S. PATENT DOCUMENTS

| 8,666,319 | B2 * | 3/2014 | Kloper | .............. | H04W 74/0808 |
| | | | | | 455/63.1 |
| 2014/0328269 | A1 | 11/2014 | Zhu et al. | | |
| 2016/0029404 | A1 * | 1/2016 | Aryafar | ............. | H04W 72/1231 |
| | | | | | 370/277 |
| 2016/0174079 | A1 | 6/2016 | Wang et al. | | |
| 2018/0084583 | A1 * | 3/2018 | Matsuo | ............. | H04W 74/0816 |
| 2018/0115997 | A1 * | 4/2018 | Son | ...................... | H04B 17/318 |

FOREIGN PATENT DOCUMENTS

EP     2939466 A1     11/2015

OTHER PUBLICATIONS

Huang, J., "Tackling the Challenges of Wireless Interference and Coexistence", a Dissertation Submitted to Michigan State University, 2012, 121 pages. <http://etd.lib.msu.edu/islandora/object/etd%3A30/datastream/OBJ/view>.

* cited by examiner

*Primary Examiner* — Kwang B Yao
*Assistant Examiner* — Juvena Loo
(74) *Attorney, Agent, or Firm* — Patterson + Sheridan, LLP

(57) ABSTRACT

Embodiments herein describe a distributed system that includes a central controller coupled to a plurality of separate radio heads. Each of the radio heads is coupled to the central controller via respective wired backends (e.g., cables). The radio heads includes one or more transceivers (e.g., radios) and antennas for wireless communicating with client devices. In the embodiments herein, the central controller can perform a variant of CCA to determine if a first one of the radio head can transmit wireless signals to, or receive wireless signals from, a first client device while a second radio head is communicating with a second client device using a combination of RTS/CTS, channel sensing, and interference cancellation techniques.

20 Claims, 10 Drawing Sheets

INTERFERENCE-CANCELLATION-BASED CCA ADJUSTMENT

TECHNICAL FIELD

Embodiments presented in this disclosure generally relate to receiving and transmitting wireless signals in parallel using multiple radio heads coupled to a central controller.

BACKGROUND

Clear Channel Assessment (CCA) is a carrier sense mechanism in wireless local area network (WLAN) or Wi-Fi which can be used to determine if a radio (e.g., a transmitter) can use a wireless channel to transmit wireless signals. CCA is defined in IEEE 802.11-2007 standards as part of the Physical Medium Dependent (PMD) and Physical Layer Convergence Protocol (PLCP) layer. CCA has two related functions: carrier sense (CCA-CS) and energy detect (CCA-ED).

In CCA-CS, a receiver detects and decodes a WiFi preamble in a received frame. The duration for which the channel will be used is typically put in the PLCP header field in the received frame. The channel is then assumed to be busy until the end of that duration.

In CCA-ED, the receiver detects non-WiFi energy in the channel (e.g., interference from microwaves or natural sources) as well as data transmission from other interfering WiFi devices. The receiver determines if the total energy in the channel is less than a predefined energy detect (ED) threshold (typically defined as 20 dB above the minimum receiver sensitivity of the physical layer (PHY)). If so, the channel is deemed busy and unusable to the device. However, if the energy is below the threshold, the device can use the channel to transmit wireless signals.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
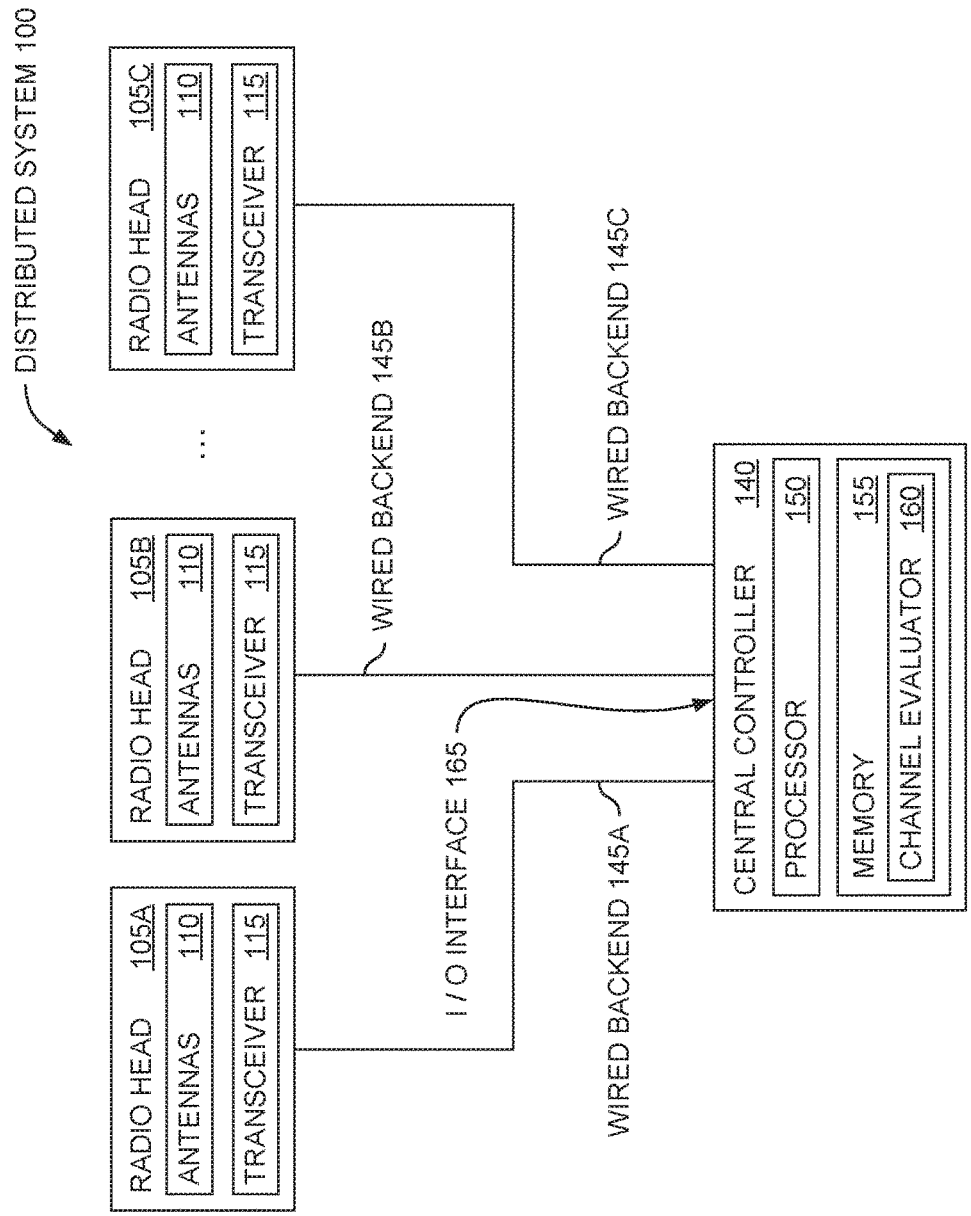
FIG. 1 illustrates a distributed system, according to one embodiment described herein.

One embodiment presented in this disclosure is a central controller that includes an I/O interface configured to couple to a plurality of radio heads, each radio head comprising at least one antenna and at least one transceiver and a channel evaluator configured to perform a clear channel assessment (CCA) on a communication channel shared by the plurality of radio heads in response to a first radio head of the plurality of radio heads receiving a request-to-send (RTS) frame from an external device. Upon determining that a second radio head of the plurality of radio heads is transmitting wireless signals, the channel evaluator is configured to determine whether interference from the second radio head on the first radio head can be cancelled by the central controller such that energy received at the first radio head satisfies a CCA threshold. Upon determining the CCA threshold is satisfied, the channel evaluator is configured to instructing the first radio head to transmit a clear-to-send (CTS) frame to the external device Another embodiment of the present disclosure is a distributed system that includes a central controller and a plurality of radio heads coupled to the central controller via respective cables where each radio head includes at least one antenna and at least one transceiver. The central controller is configured to perform CCA on a communication channel shared by the plurality of radio heads in response to a first radio head of the plurality of radio heads receiving a RTS frame from an external device and upon determining that a second radio head of the plurality of radio heads is transmitting wireless signals, determine whether interference from the second radio head on the first radio head can be cancelled by the central controller such that energy received at the first radio head satisfies a CCA threshold. Upon determining the CCA threshold is satisfied, the central controller is configured to instructing the first radio head to transmit a CTS frame to the external device.

Another embodiment of the present disclosure is a central controller that includes an I/O interface configured to couple to a plurality of radio heads, each radio head comprising at least one antenna and at least one transceiver, and a channel evaluator configure to perform a CCA on a communication channel shared by the plurality of radio heads in response to a first radio head of the plurality of radio heads receiving a RTS frame from a first external device. Upon determining that a second external device is transmitting wireless signal that are received by a second radio head of the plurality of radio heads, the channel evaluator is configured to determine whether interference from the second external device on the first radio head can be cancelled by the central controller such that a SNR target corresponding to the first radio head is satisfied when receiving wireless signals from the first external device. Upon determining the SNR target is satisfied, the central controller is configured to instruct the first radio head to transmit a CTS frame to the first external device.

Example Embodiments

The embodiments herein describe a distributed system that includes a central controller coupled to a plurality of separate radio heads. Each of the radio heads is coupled to the central controller via respective wired backends (e.g., cables). Moreover, the radio heads include one or more transceivers (e.g., radios) and antennas for wirelessly communicating with client devices. In the embodiments herein, the central controller can perform a variant of CCA to determine if a first one of the radio head can transmit wireless signals to, or receive wireless signals from, a first client device while a second radio head is communicating with a second client device.

In one embodiment, the second radio head is a source of interference at either the first radio head or the first client device. That is, if the second radio head is transmitting, a CCA threshold at either the first radio head or the first client device may be exceeded. However, the central controller can cancel the interference caused by the second radio head at the first radio heads, thereby effectively adjusting the CCA threshold for the first radio head. Moreover, based on previous communication between the first client device and the second radio head, the central controller can estimate the interference the second radio head causes at the first client device and determine if this interference is small enough to enable the first radio head to communicate with the first client device while the second radio head is also transmitting.

In one embodiment, the second client device is a source of interference at either the first radio head or the first client device. That is, if the second client device is transmitting, the CCA threshold at either the first radio head or the first client device may be exceeded. In this scenario, the central controller can mitigate the interference from the second client device at the first radio head using the signals received at the second radio head. Put differently, the central controller can first determine the data transmitted by the second client device (using the signals received at the second radio head) to mitigate the interference caused by the second client device at the first radio head. Further, the central controller can determine the amount of interference caused by the second client device at the first radio head before the first radio head transmits a Request to Send (RTS) frame to the first client device. If the first client device responds to the previously transmitted RTS frame with a Clear to Send (CTS) frame, the central controller can begin sending data to the first client device while the second client device is transmitting.

FIG. 1 illustrates a distributed system 100, according to one embodiment described herein. The distributed system 100 includes a central controller 140 that includes an I/O interface 165 coupled to multiple radio heads 105 via wired backends 145. In one embodiment, the wired backends 145A-C are each a single cable. In one embodiment, the wired backends 145 are respective copper cables (e.g., Ethernet cables) or optical cables which can permit higher data speeds than an Ethernet cable. Although in FIG. 1 the radio heads 105 are directly connected to the central controller 140 via the wired backends 145, this is not a requirement. In other embodiments, the distributed system 100 may include one or more intermediate devices (e.g., an intermediate distribution frame) between the radio heads 105 and the central controller 140.

One advantage of using Ethernet cables as the wired backends 145A-C is that a power supply (not shown) in the central controller 140 can be used to provide power-over-Ethernet (PoE) to the radio heads 105. In that case, the radio heads 105 can be located in areas that do not have power (e.g., external AC power outlets) and instead rely on the power supply in the central controller 140 to deliver power via the wired backends 145A-C. In this example, only the central controller 140 is coupled to an external power source.

The radio heads 105 include respective antennas 110 and transceivers 115 which facilitate wireless communication with other network systems or client devices. In one embodiment, the distributed system 100 may be an enterprise level deployment where the central controller 140 (e.g., a computing system enclosed in a box) is disposed in a central location in a building or campus and the wired backends 145 (optical or electrical cables) couple the central controller 140 to the radio heads 105 which are spatially distributed in the building to provide wireless access to client devices in the building.

The radio heads 105 may include any number of antennas 110 for serving any number of different transceivers 115 (e.g., individual radios). For example, the radio heads 105 may include a first set of antennas 110 with a first polarization connected to a first transceiver 115 and a second set of antennas 110 with a second, different polarization connected to a second transceiver 115. Using different polarized antennas may reduce interference when the first transceiver transmits data in the radio head 105 (in a first frequency band) and the second transceiver receives data (in a second frequency band), and vice versa.

In one embodiment, the central controller 140 uses the radio heads 105 to perform multiple input/multiple output (MIMO) or multiple user MIMO (MU-MIMO). MU-MIMO is a wireless MIMO technique where at least one radio head 105 sends different data to multiple user devices at the same time. To perform MIMO or MU-MIMO, the transceiver 115 uses respective transmit and receive filters for reducing interference from other data signals transmitted on other subcarriers. In one embodiment, the central controller 140 calculates the filters for each of the radio heads 105 for performing MIMO. For example, the more compute intensive tasks associated with routing data packets may be performed by the central controller 140 which may have a larger amount of compute capacity than the radio heads 105. Put differently, the radio heads 105 can be designed to have less compute capacity thereby reducing their cost relative to a standalone AP—i.e., an access point where all the radios, antennas, and packet processor are disposed within the same body.

The central controller 140 includes hardware components such as one or more network processors 150 and memory 155. Further, the central controller 140 may host an operating system that executes one or more software applications. In one embodiment, the radio heads 105 may include a PHY layer that receives and transmits wireless signals (i.e., an analog interface) while the central controller 140 includes a digital portion of a PHY layer and a MAC layer for processing received packets and transmitting packets to the radio heads 105. Thus, the PHY layer may be split between the radio heads 105 and the central controller 140 where the higher level processing layers are in the central controller 140. However, in one embodiment, the radio heads 105 also include high-level processing layers (e.g., MAC or physical coding sublayer (PCS)) to evaluate the received packets. For example, the radio heads 105 may include higher-level processing levels to determine if there is interference on a channel when performing CCA.

The memory 155 includes a channel evaluator 160 for determining whether a first radio head can communicate with a first client device while a second radio head communicates with a second client device. For example, the central controller 140 may want to use radio head 105A to wireless communicate to the first client device while radio heads 105B and 105C are wirelessly communicating with a second client device. The embodiments below describe how the channel evaluator 160 can consider interference caused by the radio heads 105B and 105C communicating with the second client device on the radio head 105A and first client device. Although shown as being software stored in memory 155, the channel evaluator 160 can be hardware, firmware, or combinations thereof.

In one embodiment, the radio heads 105 and the central controller 140 are perceived from the perspective of a client device as a single device—e.g., a single AP. For example, the client device can communicate with any of the radio heads 105, and from its perspective, it is communicating with the same AP. Thus, in this embodiment, the basic service set identification (BSSID) transmitted by each of the radio heads 105 is the same. Moreover, the radio heads 105 may be transmitting and receiving wireless signals in the same channel in a frequency band (e.g., the same channel in the 5 GHz or 2.4 GHz frequency bands).

In another embodiment, the central controller 140 may assign different groups of the radio heads 105 to different BSSIDs. In this case, to the perspective of an associated user device, the user device believes it is communicating with different APs depending on the BSSID of the radio head the user device is communicating with. In this example, the system 100 appears as multiple APs although all the radio heads 105 may be controlled by a single central controller 140.

Figure 2:
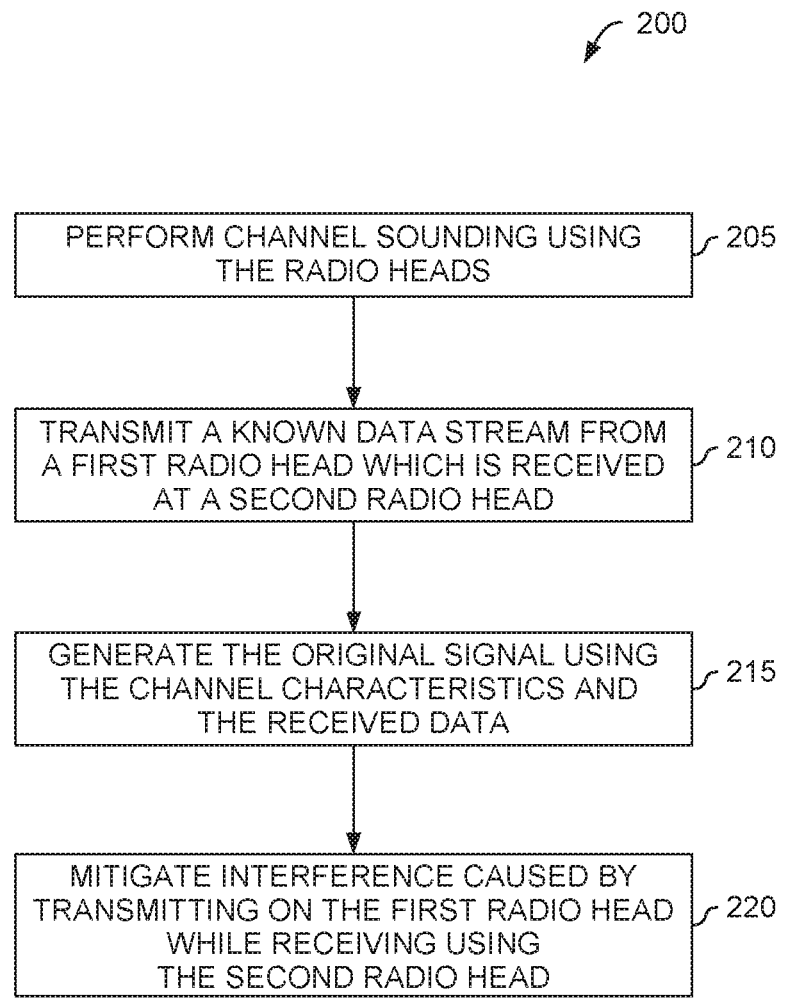
FIG. 2 is a flowchart for mitigating interference between radio heads, according to one embodiment described herein.

FIG. 2 is a flowchart for mitigating interference between radio heads, according to one embodiment described herein. At block 205, the central controller performs channel sounding using the radio heads. Channel sounding is a technique that evaluates the radio environment for wireless communication, especially MIMO systems. Because of the effect of terrain and obstacles, wireless signals propagate in multiple paths (the multipath effect). In one embodiment, the central controller can derive a matrix (i.e., a channel matrix) describing the effects on the channel on signals propagating therein. The central controller may perform sounding in channels that are between radio heads as well as between radio heads and proximate client devices. Moreover, because of changing environmental conditions, the central controller may repeat channel sounding at intervals. However, less frequent sounding may be performed if the radio heads are stationary.

At block 210, the central controller transmits a known data stream from a first radio head which is received at a second radio head. If the second radio head is currently attempting to receive a signal from an external client device, the signal transmitted from the first radio head is considered as interference. For example, if the first and second radio heads were independent access points (rather than part of the same distributed system 100 as shown in FIG. 1), the signals transmitted by the first radio head may exceed the CCA threshold at the second radio head, thereby preventing the second radio head from transmitting a CTS frame—i.e., the channel is busy. However, in the embodiments herein, the central controller is coupled to both the radio heads and thus knows which radio heads are currently transmitting which could cause interference at the other radio heads.

At block 215, the central controller generates the original signal using the channel characteristics between the radio heads determined at block 205 and the received data. For example, the channel characteristics may be the channel matrix or other transformative data structure indicating how the transmitted signals are changed by the physical environment of the channel. In one embodiment, when the second radio head receives the energy transmitted by the first radio head, the central controller captures and locks on to the frames transmitted by the first radio head to maintain synchronization between the radio heads when mitigating the inter-radio head interference. Doing so enables the central controller to determine a phase offset which is used to cancel the interfering signals.

At block 220, the central control mitigates (or removes) interference caused by transmitting on the first radio head while receiving using the second radio head. Because the central controller can generate the original signal using the channel characteristics learned from sounding the channel, the central controller can subtract the original signal from the total signal received at the second radio head. In this manner, the central controller can synchronize and remove some or all of the interference at the second radio head caused by other radio heads in the distributed system. As described below, mitigating the interference from other radio heads may mean the remaining received energy is below the CCA threshold. Stated differently, but for removing the interference caused by a neighboring radio head, the second radio head would have determined the channel is busy and would have had to wait until the first radio head was finished transmitting. In this example, the second radio head can transmit a CTS frame and begin receiving data from a first client device while the first radio head is transmitting to a second client device.

Figure 3:
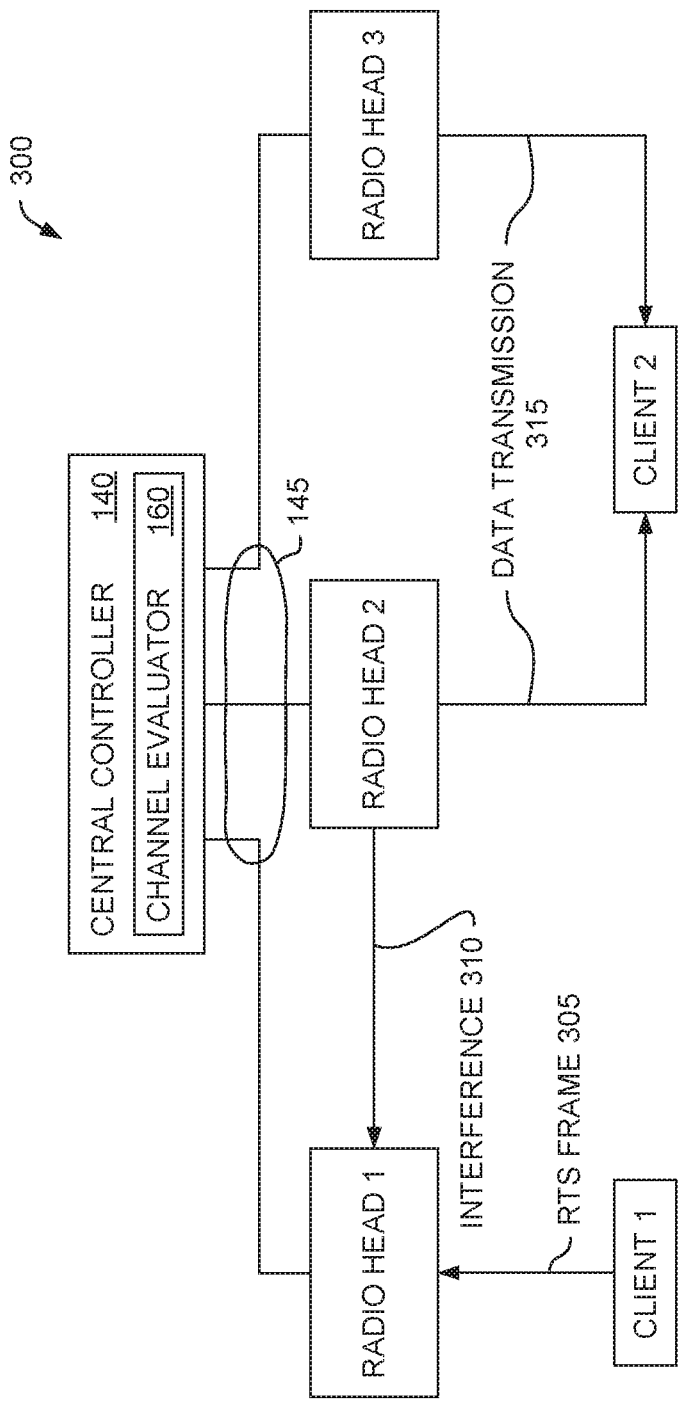
FIG. 3 illustrates a distributed system communicating in parallel with multiple client devices, according to one embodiment described herein.

FIG. 3 illustrates a distributed system 300 communicating in parallel with multiple client devices, according to one embodiment described herein. Like in FIG. 1, the distributed system 300 includes the central controller 140 coupled to a plurality of radio heads—i.e., Radio Heads 1, 2 and 3. In this example, Radio Heads 1 and 2 are transmitting data 315 to an external client device—Client 2. As a result of this data transmission 315, Radio Head 2 causes interference 310 at Radio Head 1. That is, the signal transmitted by Radio Head 2 which is intended for Client Device 2 is also received at Radio Head 1. In parallel, Radio Head 2 also receives a RTS frame 305 from another external client device—i.e., Client 1—which instructs the channel evaluator 160 to determine if the total energy received at Radio Head 1 is below the CCA threshold.

Figure 4:
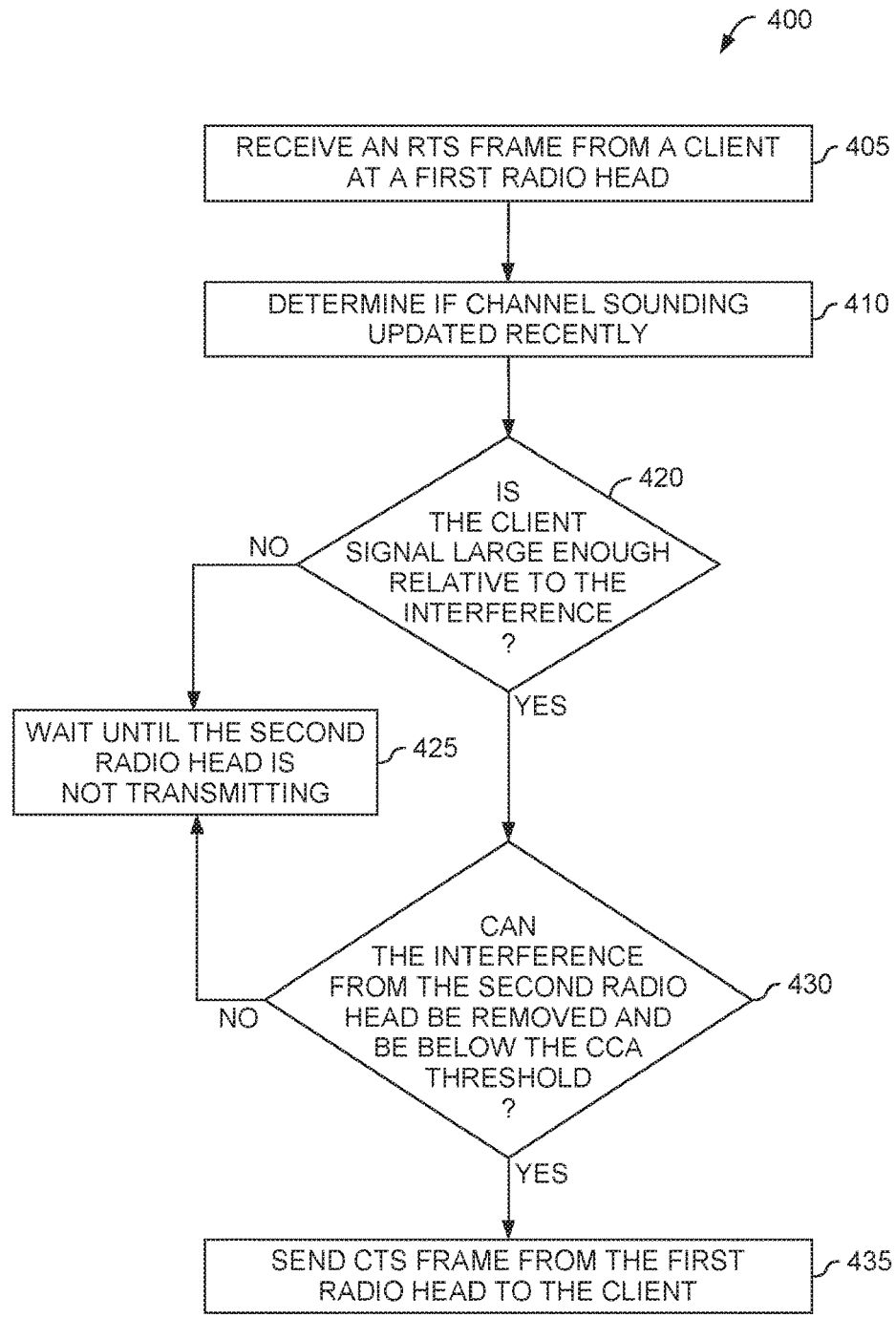
FIG. 4 is a flowchart for communicating in parallel with multiple client devices, according to one embodiment described herein.

For clarity, the distributed system 300 is discussed in tandem with FIG. 4 which is a flowchart of a method 400 for communicating in parallel with multiple client devices, according to one embodiment described herein. At block 405, Radio Head 1 receives the RTS frame from Client 1. As described above, this triggers the channel evaluator 160 to perform CCA to determine whether the channel is currently being used. However, testing to determine whether the total energy received by Radio Head 1 is above the threshold does not consider if some of the interference is from a neighboring radio head (e.g., Radio Head 2 or 3). Because these radio heads are attached to the same central controller 140, as described in FIG. 2, some or all of the inter-radio head interference can be removed from the signals received by Radio Head 1.

At block 410, the channel evaluator 160 determines if the channels between the radio heads have been sounded recently and if updated channel characteristics have been obtained. If so, method 400 proceeds to block 420 where the channel evaluator determines if the client signal is large enough relative to the interference. Stated differently, the channel evaluator 160 determines if the energy corresponding to the signals received from Client 1 (e.g., the RTS frame 305) is sufficiently large relative to the interference generated by Radio Head 2. Equation 1 illustrates using a predefined desensitization threshold to determine if the signal of Client 1 is sufficiently large:

$$\text{RH2\_Signal\_at\_RH1} - \text{Client1\_Signal\_at\_RH1} < \text{desensitization threshold} \quad (1)$$

As shown in Equation 1, if after subtracting the strength of the signal (e.g., a Received Signal Strength Indication (RSSI) value) emitted by Client 1 when received at Radio Head 1 (RH1) from the strength of the signal (e.g., RSSI) emitted by Radio Head 2 (RH2) when received at Radio Head 1 the remaining energy is less than the desensitization threshold, then the channel evaluator 160 determines the signal emitted by Client 1 is large enough relative to the interference. However, if the remaining energy exceeds the desensitization margin, the channel evaluator 160 determines that the strength of the signals received from Client 1 is not sufficient for reliable communication (even assuming some of the interference from Radio Head 2 can be mitigated). If there is not sufficient client signal, method 400 proceeds to block 425 where Radio Head 1 waits until Radio Head 2 (and 3) is not transmitting signals. Put differently, the channel evaluator 160 does not instruct Radio Head 1 to send a CTS frame in response to the received RTS frame 305.

If the client signal is sufficiently large, the method 400 proceeds to block 430 where the channel evaluator 160 determines if the interference from the Radio Head 2 can be mitigated such that the remaining energy received at Radio Head 1 is below the CCA threshold. In one embodiment, the channel evaluator 160 uses the following equation to make this determination:

$$\text{Other\_Interfer\_at\_RH1} + \text{RH2\_Signal\_at\_RH1} * \text{Cancel\_Percent} < \text{Threshold} \quad (2)$$

In Equation 2, the channel evaluator determines the amount of signal received from RH2 (i.e., RH2_Signal_at_RH1) that can be cancelled by the central controller 140 according to a percentage (Cancel_Percent) which can be 100% or less. That is, the central controller may not be able to cancel all of the signal transmitted by Radio Head 2 using method 200 in FIG. 2, but only a portion thereof. Any remaining interference from Radio Head 2 is added to any other interference (Other_Interfer_at_RH1) which may come from other client devices, network devices, natural sources, and the like, to determine if the total interference is less than the CCA threshold. If the combined interference meets or exceeds the threshold, the method 400 proceeds to block 425 to wait until the Radio Heads 2 and 3 are done transmitting before again determining if the interference at Radio Head 1 is below the threshold.

Otherwise, the method 400 proceeds to block 435 where the channel evaluator 160 instructs Radio Head 1 to send a CTS frame to Client 1 which triggers Client 1 to begin transmitting data packets to Radio Head 1. Although the combination of the signals transmitted by Client 1 and Radio Head 2 may exceed the CCA threshold at Radio Head 1, because the central controller 140 can mitigate the interference from Radio Head 2 using post processing techniques, the channel evaluator 160 permits Client 1 and Radio Head 1 to use the shared channel to send data at the same time Radio Heads 2 and 3 are transmitting. In this manner, the channel evaluator 160 effectively adjusts the CCA threshold (i.e., raises the threshold) to account for the ability of the central controller to use method 200 to mitigate at least a portion of the interference received at Radio Head 1.

Figure 5:
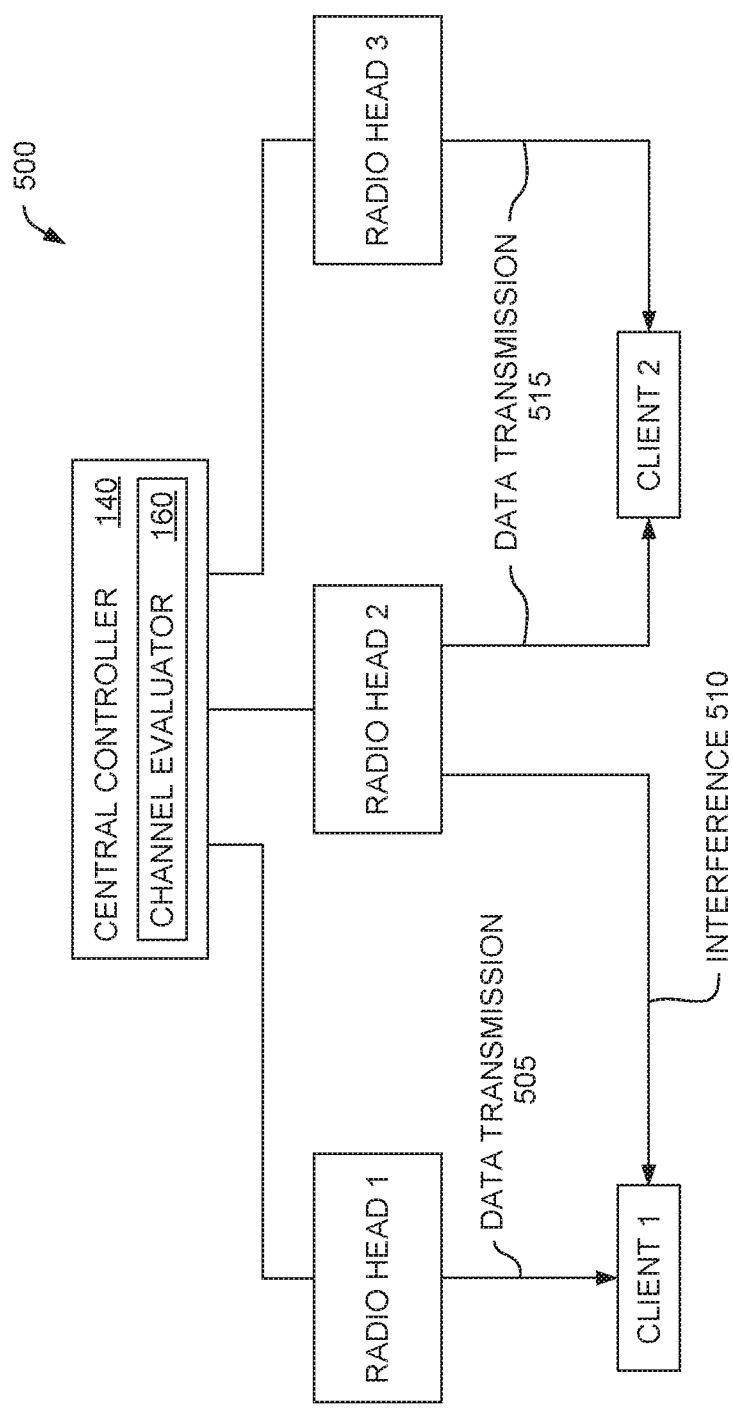
FIG. 5 illustrates a distributed system communicating in parallel with multiple client devices, according to one embodiment described herein.

FIG. 5 illustrates a distributed system 500 communicating in parallel with multiple client devices, according to one embodiment described herein. The distributed system 500 has the same physical components and devices as the distributed system 300. However, in this example, the channel evaluator 160 determines whether the interference caused by Radio Heads 2 and 3 prevents Radio Head 1 from transmitting signals to the Client 1 at the same time.

Figure 6:
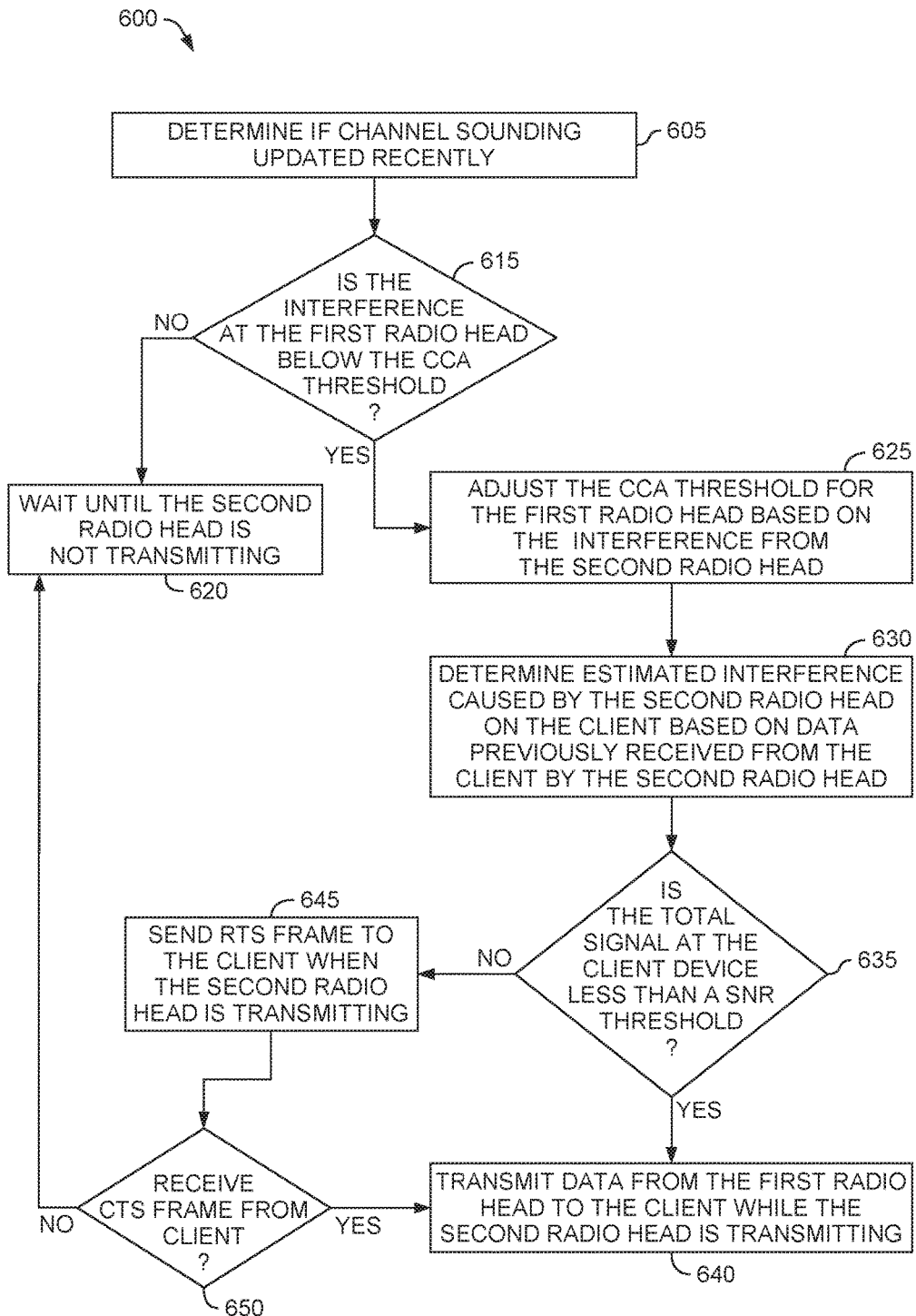
FIG. 6 is a flowchart for communicating in parallel with multiple client devices, according to one embodiment described herein.

For clarity, the distributed system 500 is discussed in tandem with FIG. 6 which is a flowchart of a method 600 for communicating in parallel with multiple client devices, according to one embodiment described herein. At block 605, the channel evaluator 160 determines if the channels between the radio heads have been sounded recently (according to a predetermined interval) and if updated channel characteristics have been obtained. If so, method 600 proceeds to block 615 where the channel evaluator 160 determines if the interference at Radio Head 1 is below the CCA threshold. In one embodiment, the channel evaluator 160 makes this determination when Radio Heads 2 and 3 are not transmitting signals—e.g., at a time before the state of the distributed system 500 shown in FIG. 5 where Radio Heads 2 and 3 are transmitting.

If the interference at Radio Head 1 excluding Radio Heads 2 and 3 is above the threshold, the method 600 proceeds to block 620 where the channel evaluator 160 waits until Radio Head 2 is not transmitting before transmitting data to Client 1. If, however, the interference is below the CCA threshold, the method 600 proceeds to block 625 where the channel evaluator 160 adjusts the CCA threshold for Radio Head 1 based on the interference from Radio Head 2. In one embodiment, the channel evaluator 160 adds the interference attributable to Radio Head 2 to the CCA threshold as shown:

$$\text{CCA\_Threshold} + \text{RSSI\_RH2\_at\_RH1} = \text{CCA\_Threshold\_Adj} \quad (3)$$

In Equation 3, the strength of the signal received from Radio Head 2 is added to the original CCA threshold to result in the adjusted CCA threshold.

At block 630, the channel evaluator 160 determines estimated interference caused by Radio Head 2 on Client 1 based on data previously received from Client 1 by Radio Head 2. For example, Radio Head 2 may have previously received a data frame from Client 1. In one embodiment, the channel evaluator 160 uses the following equation to determine if the estimated interference exceeds a signal-to-noise ratio (SNR) target at Client 1.

$$\text{RH1\_at\_Client1} - (\text{RH2\_at\_Client1} + \text{RH3\_at\_Client1}) > \text{SNR\_Target} \quad (4)$$

In Equation 4, the channel evaluator 160 determines whether the combined RSSIs of the signals emitted by Radio Heads 2 and 3 when subtracted from the RSSI of the signals emitted by Radio Head 1 are greater than the SNR target. Equation 4 assumes that Radio Heads 2 and 3 have previously received a data frame from Client 1 which permits the channel evaluator 160 to estimate the reciprocal effect the physical properties of the communication channel between the Radio Heads 2 and 3 and Client 1 has on signals transmitted by the Radio Heads 2 and 3 when received by Client 1.

The channel evaluator 160 does not need to determine the actual (or absolute) RSSI values at the Client 1 resulting from the signals transmitted by Radio Heads 1-3, but rather can rely on the difference between the RSSIs transmitted by Radio Head 1 and Radio Heads 2 and 3. This difference can be estimated based on the difference in RSSI values of the signals emitted by Client 1 that are received at the Radio Heads 1-3. That is, whatever the difference was in the RSSI values of the signals received at Radio Heads 1-3, the channel evaluator 160 can assume the same difference will result when transmitting signals from the Radio Heads 1-3 to the Client 1. As shown in Equation 4, the channel evaluator 160 can determine if this difference is greater than the SNR target.

If the difference is more than the SNR target, the method 600 proceeds to block 640 and Radio Head 1 transmits data to Client 1 while Radio Heads 2 and 3 are transmitting. That is, the channel evaluator 160 can instruct Radio Head 1 to begin data transmission to Client 1 without having to send or receive RTS and CTS frames. Thus, by determining that the estimated interference at Client 1 is less than the SNR target, the channel evaluator 160 can avoid transmitting and receiving the RTS and CTS frames which take time that could otherwise be used for data transmission.

However, if the interference is above the SNR target, the method 600 proceeds from block 635 to block 645 where the channel evaluator 160 instructs Radio Head 1 to send an RTS frame to Client 1 while the Radio Heads 2 and 3 are transmitting. In response, Client 1 performs CCA evaluation to determine whether the interference 510 from Radio Head 2 (and possibly Radio Head 3) is less than the CCA threshold. If so, Client 1 transmits a CTS frame. If at block 650 a CTS frame is received from Client 1, the method 600 proceeds to block 640 where data transmission can begin between Radio Head 1 and Client 1 using the shared channel. Otherwise, the method 600 proceeds to block 620 where the central controller does not permit Radio Head 1 to transmit data until Radio Heads 2 and 3 are no longer transmitting. For example, the channel evaluator 160 may instruct Radio Head 1 to transmit another RTS frame after Radio Heads 2 and 3 finish transmitting data to Client 2.

Figure 7:
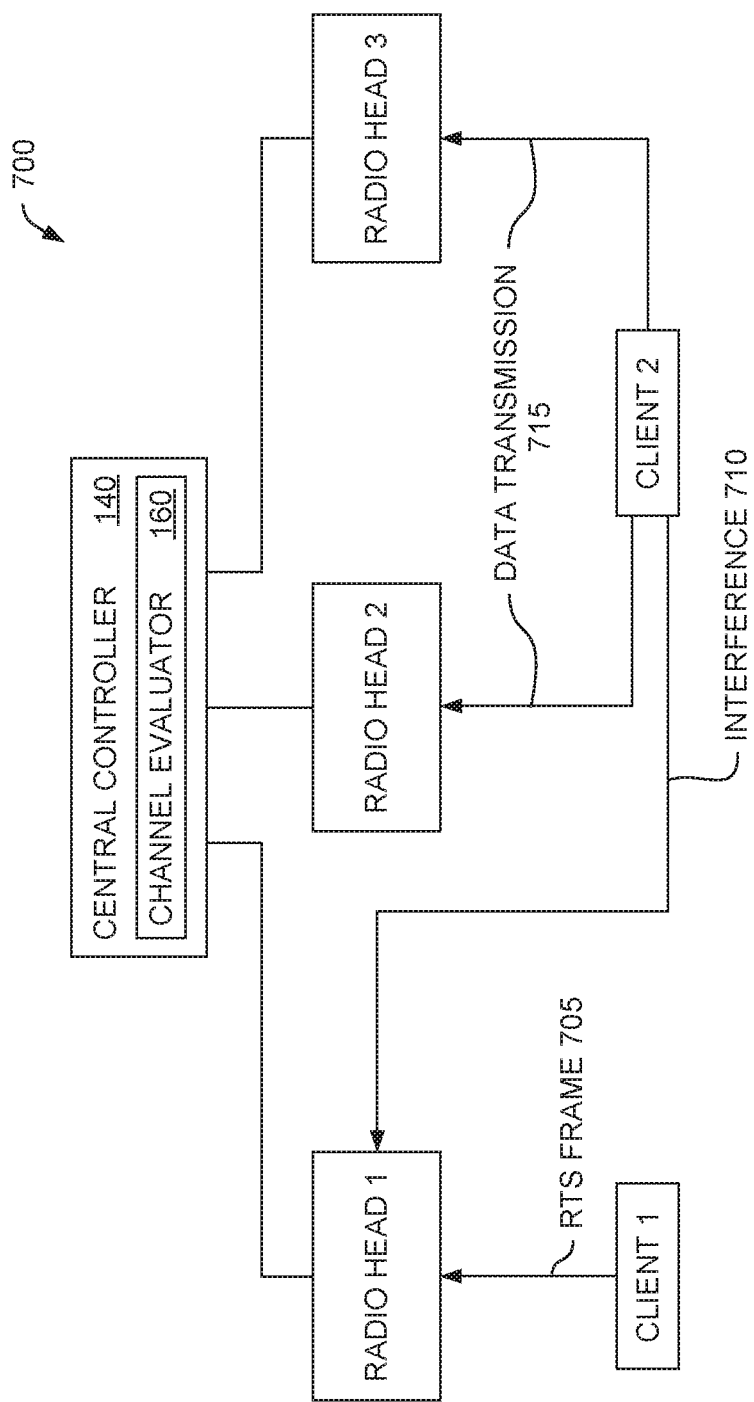
FIG. 7 illustrates a distributed system communicating in parallel with multiple client devices, according to one embodiment described herein.

FIG. 7 illustrates a distributed system 700 communicating in parallel with multiple client devices, according to one embodiment described herein. In this scenario, the distributed system 700 considers interference from one client device that may interfere with communication with another client device. Here, Client 2 is transmitting signals that are received at all three radio heads. While the central controller 140 wants to receive data transmission 715 from Client 2 on Radio Heads 2 and 3, the signals transmitted by Client 2 generate interference 710 at Radio Head 1. Thus, when Client 1 transmits an RTS frame 705, the interference 710 caused by Client 2 may exceed the CCA threshold for Radio Head 1.

Figure 8:
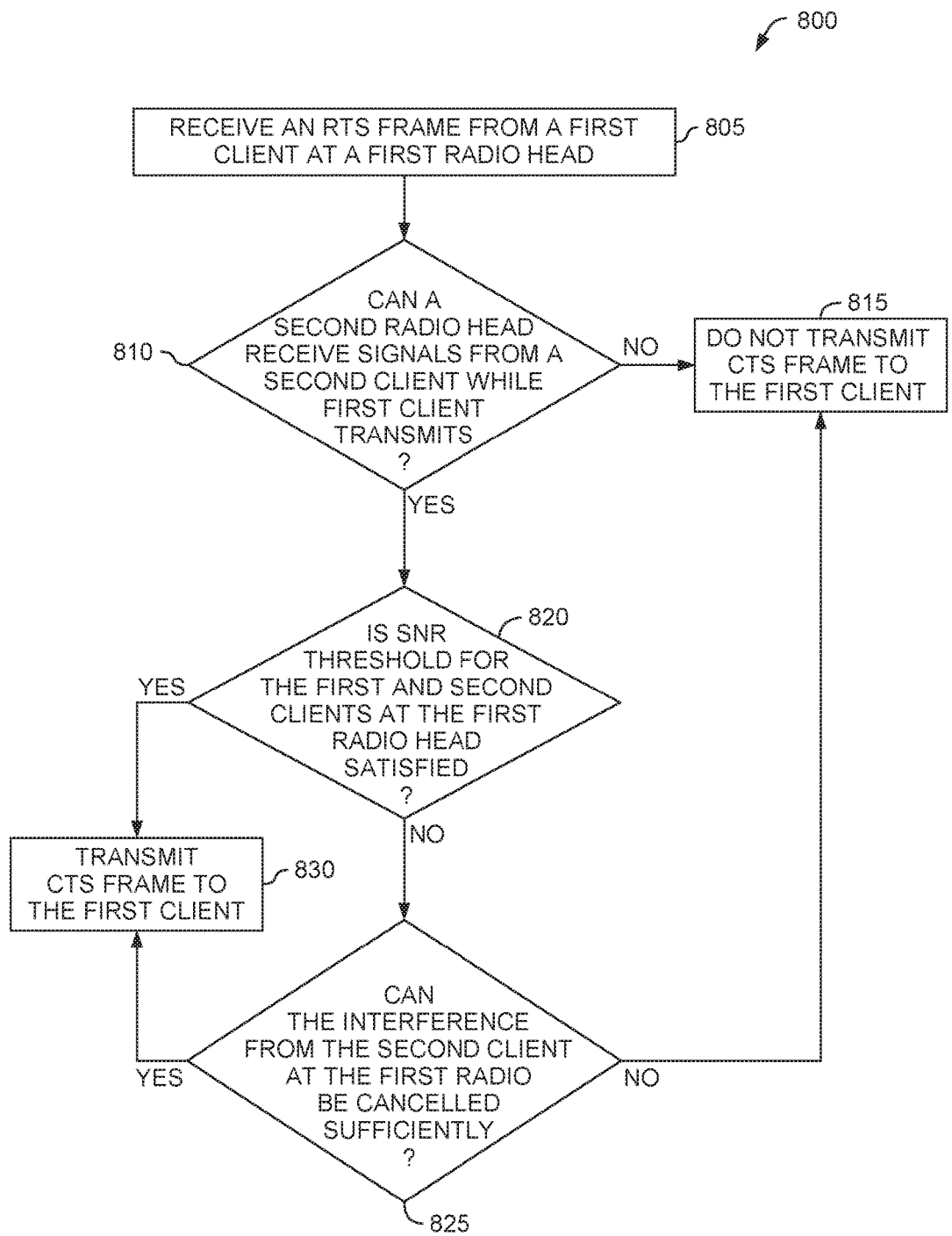
FIG. 8 is a flowchart for communicating in parallel with multiple client devices, according to one embodiment described herein.

For clarity, the distributed system 700 is discussed in tandem with FIG. 8 which is a flowchart of a method 800 for communicating in parallel with multiple client devices, according to one embodiment described herein. At block 805, Radio Head 1 receives the RTS frame 705 from Client 1. At block 810, the channel evaluator 160 determines whether another radio head (e.g., Radio Heads 2 or 3) can receive signals from a different client device (e.g., Client 2) while Client 1 is transmitting the RTS frame. To do so, the channel evaluator may determine if the data transmission 715 from Client 2 is strong enough for successful reception at Radio Heads 2 and 3 even while Client 1 is transmitting. That is, the channel evaluator 160 determines whether transmitting with Client 1 will prevent the data reception 715 from Client 2 at Radio Heads 2 and 3 (which has already started) from continuing. If Client 1 will prevent communication between Radio Heads 2 and 3 and Client 2, the method 800 proceeds to block 815 where the central controller 140 does not transmit a CTS frame from Radio Head 1 to Client 1 in response to the RTS frame 705.

If, however, data reception 715 is sufficiently strong at Radio Heads 2 and 3 when Client 1 is transmitting, the method 800 proceeds to block 820 where the channel evaluator 160 determines if the SNR threshold at Radio Head 1 is satisfied. In one embodiment, the channel evaluator checks whether the strength of the signals received from Client 1 at Radio Head 1 satisfies the SNR threshold despite interference from Client 2 and any other sources. For example, the channel evaluator 160 may use the following equation:

$$\text{Client1\_at\_RH1} - \text{Client2\_at\_RH1} - \text{Other\_Interfer\_at\_RH1} > \text{SNR\_Target} \quad (5)$$

The channel evaluator 160 can use Equation 5 to determine if the signal strength of the signals emitted by Client 1 exceed the SNR target even when Client 2 (as well as all other possible interferes) is transmitting. If so, then the method 800 proceeds to block 830. However, if Equation 5 is not true and the signal strength from Client 1 at Radio Head 1 does not exceed the SNR target, the method 800 proceeds to block 825 where the channel evaluator determines if the interference from Client 2 at Radio Head 1 can be cancelled or mitigated. Here, the channel evaluator 160 determines if interference mitigation can be used to remove some interference such that the strength of the signal transmitted by Client 1 (in the presence of interference) is greater than the SNR target. In one embodiment, the channel evaluator 160 uses the following equation to determine if mitigating the interference from Client 2 means the SNR target is now satisfied:

$$\text{Client1\_at\_RH1} - \text{Client2\_at\_RH1} * \text{Percent\_Cancel} - \text{Other\_Interfer\_at\_RH1} > \text{SNR\_Target} \quad (6)$$

Equation 6 is similar to Equation 5 except that the channel evaluator 160 considers whether a portion of the interference from Client 2 (i.e., Client2_at_RH1) can be reduced by a cancellation percentage (i.e., Percent_Cancel). As the cancellation percentage increases, the value of the interference resulting from Client 2 is reduced which increases the likelihood that the signal strength from Client 1 is greater than the SNR target.

Equation 6 assumes that signals transmitted by Client 2 are known to the central controller. That is, to mitigate the interference from Client 2, the central controller receives the signals transmitted by Client 2 at Radio Heads 2 and 3 and uses post processing to reproduce the original signal transmitted by Client 2. The central controller 140 can use the channel characteristics between Radio Heads 2 and 3 and Client 2 to reproduce the original signal as it was transmitted by Client 2. Once the original signal is identified, the central controller can then reproduce the signal from Client 2 as would be received at Radio Head 1 and subtract this signal from the signal received at Radio Head 1. The effectiveness of this interference mitigation results in the value of the cancellation percentage shown in Equation 6.

In one embodiment, mitigating the interference from Client 2 on Radio Head 1 is performed after the data transmission 715 between Client 2 and Radio Heads 2 and 3 is completed. Stated differently, the channel evaluator may ensure that the time period of data transmission 715 between Client 2 and Radio Heads 2 and 3 will complete before the data transmission between Client 1 and Radio Head 1. For example, when transmitting data to the distributed system 700, Client 2 may tell the system 700 when the data transmission 715 will complete—i.e., provide a data transmission time period. Similarly, the RTS frame 705 sent by Client 1 may indicate how long the data transmission from Client 1 to the distributed system 700 will last. Using this information, the channel evaluator 160 can determine whether the data transmission from Client 2 will end before the data transmission from Client 1. If so, the channel evaluator 160 can perform interference mitigation as shown in Equation 6 since the signals received by Radio Heads 2 and 3 from Client 2 can be processed to determine the original signals transmitted from Client 2 which then can be subtracted from the signals received at Radio Head 1. Thus, in this embodiment, the channel evaluator 160 may perform Equation 6 to determine if interference from Client 2 can be cancelled only if the data transmission from Client 2 will terminate before the data transmission from Client 1 will end.

If the channel evaluator 160 determines that interference from Client 2 cannot be sufficiently mitigated such that the SNR threshold is satisfied (or that the data transmission form Client 2 will not end before the data transmission from Client 1), the method 800 proceeds to block 815 where the central controller does not transmit a CTS frame from Radio Head 1 to Client 1. Instead, the central controller may wait until Client 2 is finished transmitting before again determining if the channel is sufficiently clear for Client 1 to begin transmitting data to Radio Head 1.

However, if either query at block 820 or block 825 is satisfied, the method 800 proceeds to block 830 where the central controller instructs Radio Head 1 to transmit a CTS frame to Client 1. This indicates to Client 1 that interference from Client 2 is either too small to prevent successful communication or can be mitigated using post-processing interference cancellation as discussed in method 200 of FIG. 2. As such, the Client 1 can transmit data to the distributed system 700 in parallel with Client 2.

Figure 9:
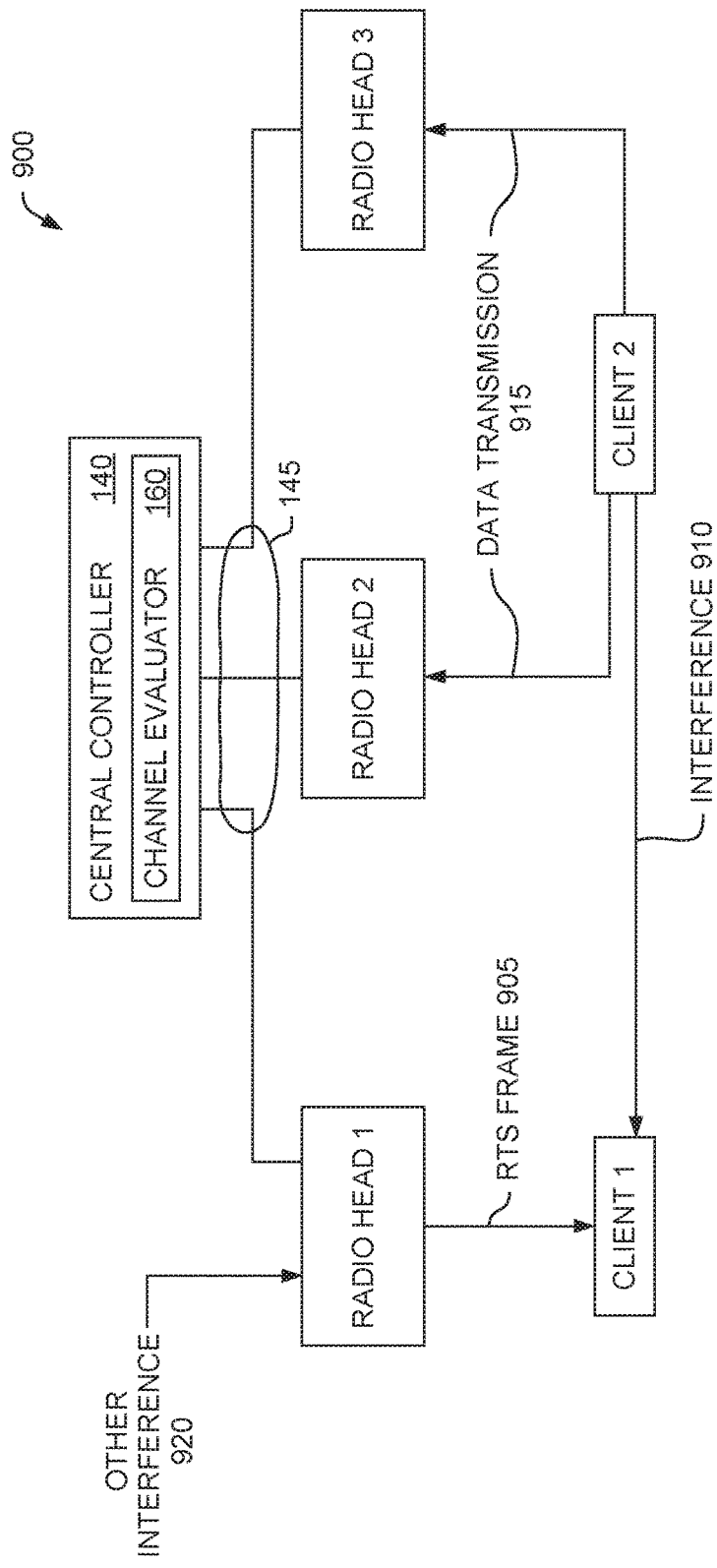
FIG. 9 illustrates a distributed system communicating in parallel with multiple client devices, according to one embodiment described herein.

FIG. 9 illustrates a distributed system 900 communicating in parallel with multiple client devices, according to one embodiment described herein. The distributed system 900 has the same components as the distributed system 700 in FIG. 7 except here the channel evaluator 160 considers interference 910 caused by Client 2 at Client 1.

Figure 10:
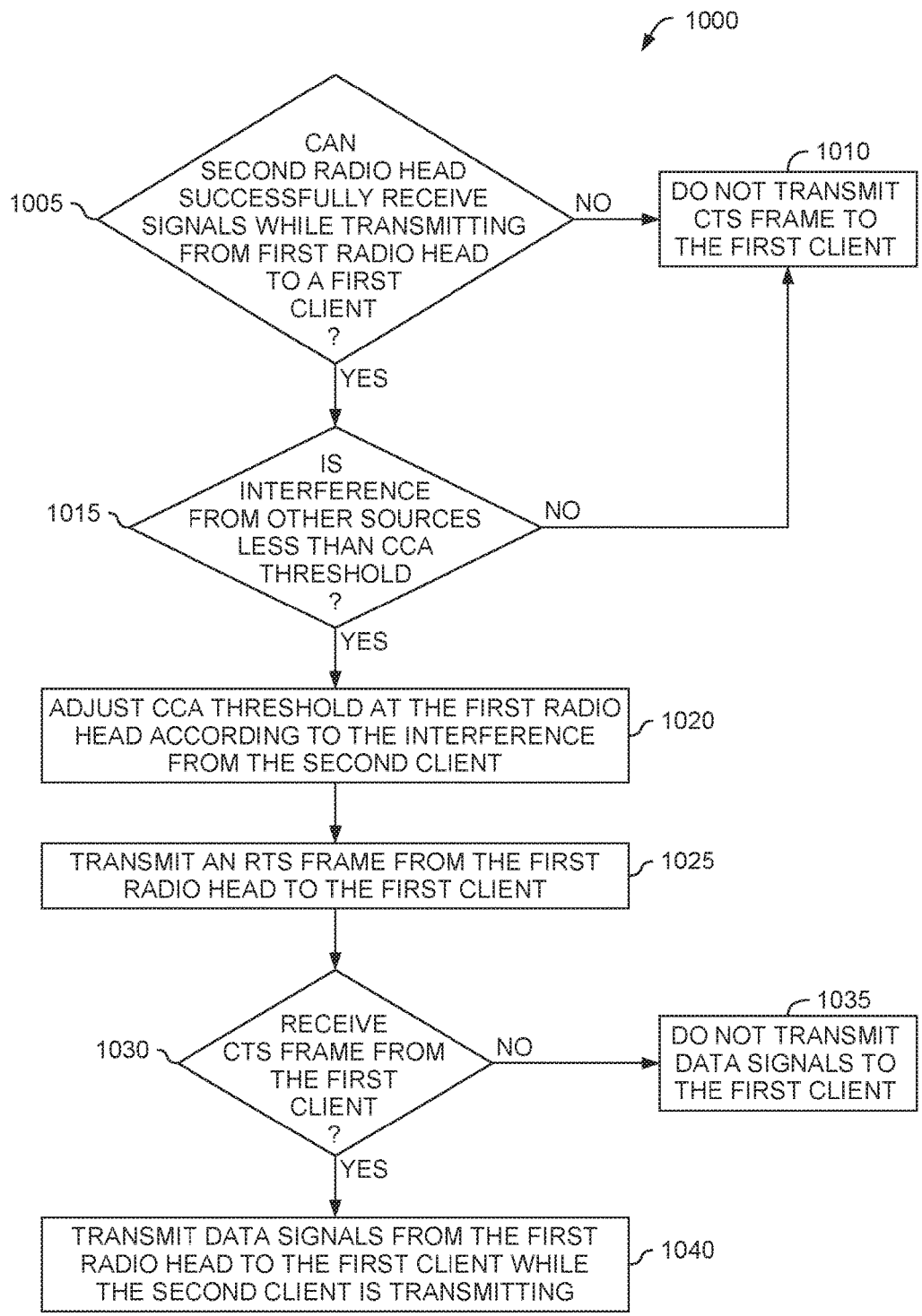
FIG. 10 is a flowchart for communicating in parallel with multiple client devices, according to one embodiment described herein.

For clarity, the distributed system 900 is discussed in tandem with FIG. 10 which is a flowchart of a method 1000 for communicating in parallel with multiple client devices, according to one embodiment described herein. At block 1005, the channel evaluator 160 determines whether Radio Heads 2 and 3 can successfully receive signals from Client 2 while transmitting from Radio Head 1 to Client 1. To do so, the channel evaluator 160 may determine if data transmission 915 from Client 2 is strong enough for successful reception at Radio Heads 2 and 3 even while Client 1 is transmitting the RTS frame 905. That is, the channel evaluator 160 determines whether transmitting with Radio Head 1 will prevent the data transmission 915 from Client 2 to Radio Heads 2 and 3 (which has already started) from continuing.

If transmitting from Radio Head 1 will prevent communication between Radio Heads 2 and 3 and Client 2, the method 1000 proceeds to block 1010. Otherwise, the method 1000 proceeds to block 1015 where the channel evaluator 160 determines whether interference at Radio Head 1 and from other sources (if any) is less than the CCA threshold. That is, the channel evaluator 160 performs CCA to ensure that other sources of interference besides the ones shown does not cause the interference at Radio Head 1 to exceed the CCA threshold.

If the interference from the other sources at Radio Head 1 is less than the CCA threshold, the method 1000 proceeds to block 1020 where the channel evaluator 160 adjusts the CCA threshold at Radio Head 1 according to the interference from Client 2. For example, the new adjusted CCA threshold can be defined as:

$$CCA\_Threshold + RSSI\_Client2\_at\_RH1 = CCA\_Adj\_Threshold \quad (7)$$

In one embodiment, the channel evaluator 160 adjusts the CCA threshold since the interference from Client 2 can be mitigated as described previously at block 825 in method 800. That is, the channel evaluator 160 can ignore the interference from Client 2 at Radio Head 1 since post processing can be used to remove these received signals.

At block 1025, the channel evaluator instructs Radio Head 1 to transmit an RTS frame 905 to Client 1. In this embodiment, the transmission is protected by RTS since the central controller 140 does not have reliable information regarding the communication channel between Client 1 and Client 2. That is, the central controller 140 may not know how much interference Client 2 causes at Client 1, and thus, sends the RTS frame and waits to receive a CTS frame. At block 1030, the channel evaluator 160 determines whether the distributed system 900 has received the CTS frame from the Client 1. If not, the method 1000 proceeds to block 1035 where the central controller determines to not transmit data signals from Radio Head 1 to Client 1. However, if the CTS frame is received, the method 1000 proceeds to block 1040 where the Radio Head 1 can transmit data signals to Client 1 while Client 2 is transmitting data to the distributed system 900.

In one embodiment, the embodiments described above can be applied to full duplex modes of communication where the radio heads are both transmitting and receiving in parallel rather than doing one or the other at separate times.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A central controller, comprising:
an I/O interface configured to couple to a plurality of radio heads, each radio head comprising at least one antenna and at least one transceiver; and
a channel evaluator configured to:
perform a clear channel assessment (CCA) on a communication channel shared by the plurality of radio heads in response to a first radio head of the plurality of radio heads receiving a request-to-send (RTS) frame from an external device, upon determining that a second radio head of the plurality of radio heads is transmitting wireless signals, determine whether interference from the second radio head on the first radio head can be cancelled from signals received at the first radio head by the central controller such that energy received at the first radio head satisfies a CCA threshold, and upon determining the CCA threshold is satisfied, instructing the first radio head to transmit a clear-to-send (CTS) frame to the external device.

2. The central controller of claim 1, wherein, after transmitting the CTS frame, the I/O interface is configured to transmit wireless data signals using the second radio head in parallel with receiving data signals from the external device via the first radio head.

3. The central controller of claim 1, wherein the channel evaluator is configured to:

perform sounding between the first radio head and the second radio head to determine channel characteristics, and perform interference mitigation, using the channel characteristics, on the signals received via the first radio head while the second radio head is transmitting the wireless signals, wherein the interference mitigation removes at least a portion of the wireless signals transmitted by the second radio head from the signals received at the first radio head.

4. The central controller of claim 3, configured to:

synchronize the first and second radio heads to determine a phase offset for performing the interference mitigation.

5. The central controller of claim 1, wherein the channel evaluator is configured to:

determine if energy corresponding to the RTS frame received at the first radio head is sufficiently large relative to the interference generated by the second radio head using a predefined desensitization threshold.

6. The central controller of claim 1, wherein the channel evaluator is configured to:

receive a request to transmit data from the first radio head to the external device while the second radio head is transmitting data wirelessly, upon determining interference at the first radio head is below the CCA threshold, adjusting the CCA threshold in accordance to a signal strength of the wireless signals emitted by the second radio head that are received at the first radio head, and determine an estimated interference of the second radio head on the external device based on wireless signals previously received at the second radio head from the external device, and upon determining the estimated interference satisfies a signal-to-noise (SNR) target corresponding to the external device, instructing the first radio head to begin transmitting the data to the external device while the second radio head is transmitting.

7. The central controller of claim 6, wherein the central controller does not instruct any of the plurality of radio heads to transmit a second RTS frame to the external device before the channel evaluator instructs the first radio head to begin transmitting the data to the external device.

8. A distributed system, comprising:

a central controller; and a plurality of radio heads coupled to the central controller via respective cables, each radio head comprising at least one antenna and at least one transceiver, wherein the central controller is configured to:

perform a clear channel assessment (CCA) on a communication channel shared by the plurality of radio heads in response to a first radio head of the plurality of radio heads receiving a request-to-send (RTS) frame from an external device, upon determining that a second radio head of the plurality of radio heads is transmitting wireless signals, determine whether interference from the second radio head on the first radio head can be cancelled from signals received at the first radio head by the central controller such that energy received at the first radio head satisfies a CCA threshold, and upon determining the CCA threshold is satisfied, instructing the first radio head to transmit a clear-to-send (CTS) CTS frame to the external device.

9. The distributed system of claim 8, wherein, after transmitting the CTS frame, the central controller is configured to transmit wireless data signals using the second radio head in parallel with receiving data signals from the external device via the first radio head.

10. The distributed system of claim 8, wherein the central controller is configured to:

perform sounding between the first radio head and the second radio head to determine channel characteristics, and perform interference mitigation, using the channel characteristics, on the signals received via the first radio head while the second radio head is transmitting the wireless signals, wherein the interference mitigation removes at least a portion of the wireless signals transmitted by the second radio head from the signals received at the first radio head.

11. The distributed system of claim 10, wherein the central controller is configured to:

synchronize the first and second radio heads to determine a phase offset for performing the interference mitigation.

12. The distributed system of claim 8, wherein the central controller is configured to:

determine if energy corresponding to the RTS frame received at the first radio head is sufficiently large relative to the interference generated by the second radio head using a predefined desensitization threshold.

13. The distributed system of claim 8, wherein the central controller is configured to:

receive a request to transmit data from the first radio head to the external device while the second radio head is transmitting data wirelessly, upon determining interference at the first radio head is below the CCA threshold, adjusting the CCA threshold in accordance to a signal strength of the wireless signals emitted by the second radio head that are received at the first radio head, and determine an estimated interference of the second radio head on the external device based on wireless signals previously received at the second radio head from the external device, and upon determining the estimated interference satisfies a signal-to-noise (SNR) target corresponding to the external device, instructing the first radio head to begin transmitting the data to the external device while the second radio head is transmitting.

14. The distributed system of claim 13, wherein the central controller does not instruct any of the plurality of radio heads to transmit a second RTS frame to the external device before the central controller instructs the first radio head to begin transmitting the data to the external device.

15. A central controller, comprising:
- an I/O interface configured to couple to a plurality of radio heads, each radio head comprising at least one antenna and at least one transceiver; and
- a channel evaluator configured to:
  - perform a clear channel assessment (CCA) CCA on a communication channel shared by the plurality of radio heads in response to a first radio head of the plurality of radio heads receiving a request-to-send (RTS) RTS frame from a first external device,
  - upon determining that a second external device is transmitting wireless signal that are received by a second radio head of the plurality of radio heads, determine whether interference from the second external device on the first radio head can be cancelled from signals received at the first radio head by the central controller such that a signal-to-noise (SNR) target corresponding to the first radio head is satisfied when receiving wireless signals from the first external device, and
  - upon determining the SNR target is satisfied, instruct the first radio head to transmit a clear-to-send (CTS) frame to the first external device.

16. The central controller of claim 15, wherein the channel evaluator is configured to:
- transmit the CTS frame only if the second radio head can continue to successfully receive signals from the second external device while the first external device transmits data signals to the first radio head.

17. The central controller of claim 15, wherein determining whether interference from the second external device on the first radio head can be cancelled by the central controller comprises:
- determining a cancellation percentage of the signal emitted by the second external device that can be removed at the first radio head, and
- subtracting a portion of the signal indicated by the cancellation percentage from a signal strength of the signal transmitted by the first external device and received by the first radio head to determine if the SNR target is satisfied.

18. The central controller of claim 17, wherein determining whether interference from the second external device on the first radio head can be cancelled by the central controller comprises:
- upon determining that a data transmission time period of the second external device will expire before a data transmission time period of the first external device corresponding to the RTS frame, mitigating the interference from the second external device on the first radio head resulting from the wireless signals transmitted by the second external device.

19. The central controller of claim 15, wherein the channel evaluator is configured to:
- receive a request to transmit data from the first radio head to the first external device while the second external device is transmitting data wirelessly,
- upon determining interference at the first radio head is below a CCA threshold, adjust the CCA threshold in accordance to a signal strength of the wireless signals emitted by the second external device that are received at the first radio head, and
- instruct the first radio head to transmit a different RTS frame to the first external device.

20. The central controller of claim 19, wherein the channel evaluator is configured to:
- upon receiving a different CTS frame from the first external device, permitting the first radio head to transmit wireless data signals to the first external device while the second external device transmits wireless data signals to the second radio head.

* * * * *

UNITED STATES PATENT AND TRADEMARK OFFICE
CERTIFICATE OF CORRECTION

| | | |
|---|---|---|
| PATENT NO. | : 10,236,998 B1 | Page 1 of 1 |
| APPLICATION NO. | : 15/409293 | |
| DATED | : March 19, 2019 | |
| INVENTOR(S) | : Pooya Monajemi | |

It is certified that error appears in the above-identified patent and that said Letters Patent is hereby corrected as shown below:

On the Title Page

In item (73), in Column 1, in "Assignee", Line 1, delete "Technology" and insert -- Technology, --, therefor.

In the Claims

In Column 16, Line 20, in Claim 8, after "(CTS)" delete "CTS".

In Column 17, Line 11, in Claim 15, after "(CCA)" delete "CCA".

In Column 17, Line 16, in Claim 15, after "(RTS)" delete "RTS".

Signed and Sealed this
Fourth Day of June, 2019

Andrei Iancu
*Director of the United States Patent and Trademark Office*